US007607296B2

(12) United States Patent
Ohigashi et al.

(10) Patent No.: US 7,607,296 B2
(45) Date of Patent: Oct. 27, 2009

(54) DEVICE AND METHOD OF CONTROLLING HYDRAULIC DRIVE OF CONSTRUCTION MACHINERY

(75) Inventors: Koji Ohigashi, Hirakata (JP); Takashi Kawakami, Hirakata (JP); Kenzo Kimoto, Hirakata (JP)

(73) Assignee: Komatsu Ltd., Tokyo (JP)

( * ) Notice: Subject to any disclaimer, the term of this patent is extended or adjusted under 35 U.S.C. 154(b) by 384 days.

(21) Appl. No.: 10/581,883

(22) PCT Filed: Dec. 8, 2004

(86) PCT No.: PCT/JP2004/018313

§ 371 (c)(1),
(2), (4) Date: Jun. 6, 2006

(87) PCT Pub. No.: WO2005/056933

PCT Pub. Date: Jun. 23, 2005

(65) Prior Publication Data

US 2007/0101708 A1 May 10, 2007

(30) Foreign Application Priority Data

Dec. 9, 2003 (JP) ............................ 2003-410518

(51) Int. Cl.
*F16D 31/02* (2006.01)

(52) U.S. Cl. ....................................................... 60/431

(58) Field of Classification Search ................... 60/431, 60/433, 434, 449
See application file for complete search history.

(56) References Cited

U.S. PATENT DOCUMENTS 4,773,369 A * 9/1988 Kobayashi et al. ............ 60/434

FOREIGN PATENT DOCUMENTS

| | | |
|---|---|---|
| JP | 2-38630 A | 2/1990 |
| JP | 08-165680 A | 6/1996 |
| JP | 11-166248 A | 6/1999 |
| JP | 11-166482 A | 6/1999 |

(Continued)

OTHER PUBLICATIONS

Japanese Office Action dated Feb. 26, 2008, issued in corresponding Japanese Patent Application No. 2005-516151.

(Continued)

*Primary Examiner*—Michael Leslie
(74) *Attorney, Agent, or Firm*—Westerman, Hattori, Daniels & Adrian, LLP

(57) ABSTRACT

In construction machinery, control is conducted to keep a work machine to operate at a constant speed regardless of the operation thereof. Different engine output lines T0-T3 and pump torque lines M1-M4 are defined for different operation types. All the matching points of the engine output lines T0-T3 and pump torque lines M1-M4 designate a constant engine speed N1. One engine output line and one pump torque line are selected according to the operation type presently selected. An output horsepower of the engine is controlled on an equal horsepower line corresponding to a sum of a horsepower for an auxiliary machine and a horsepower at a matching point of the selected lines. The pump torque for the work machine is controlled on the selected pump torque line. The engine operates at a constant speed N1 even when the operation type varies or the horsepower for the auxiliary machine changes.

8 Claims, 11 Drawing Sheets

FOREIGN PATENT DOCUMENTS

| | | | |
|---|---|---|---|
| JP | 11-293710 | A | 10/1999 |
| JP | 2001-329883 | A | 11/2001 |
| JP | 2002-295408 | A | 10/2002 |
| JP | 2003-329012 | A | 11/2003 |

OTHER PUBLICATIONS

International Search Report mailed Apr. 26, 2005 of International Application PCT/JP2004/018313.

* cited by examiner

FIG. 3

| OPERATION MODE | MATCHING REVOLUTION SPEED | PUMP TORQUE CONTROL LINE | ENGINE OUTPUT TORQUE CONTROL LINE | OUTPUT HORSEPOWER AT MATCHING POINT | CASE CLASSIFICATION DEPENDING ON AUXILIARY MACHINE HORSEPOWER | ENGINE OUTPUT |
|---|---|---|---|---|---|---|
| A1 | N1 | M1 | T0 | P0 | | P0 |
| A2 | N1 | M2 | T1 | P1 | $\Sigma Lf \geqq Ls$ | P0 |
| | | | | | $\Sigma Lf < Ls$ | $P_1 + \Sigma Lf$ |
| A3 | N1 | M3 | T2 | P2 | | $P_2 + \Sigma Lf$ |
| A4 | N1 | M4 | T3 | P3 | | $P_3 + \Sigma Lf$ |

50

FIG. 5

| OPERATION MODE | MATCHING REVOLUTION SPEED | PUMP TORQUE CONTROL LINE | ENGINE OUTPUT TORQUE CONTROL LINE | OUTPUT HORSEPOWER AT MATCHING POINT | ENGINE OUTPUT |
|---|---|---|---|---|---|
| E1 | N6 | M5 | T4 | P4 | $P_4+\Sigma$ Lf |
| E2 | N6 | M6 | T5 | P5 | $P_5+\Sigma$ Lf |

50

FIG. 10

| OPERATION MODE | MATCHING TORQUE | PUMP TORQUE CONTROL LINE | ENGINE OUTPUT TORQUE CONTROL LINE | ENGINE OUTPUT | OUTPUT HORSEPOWER AT MATCHING POINT |
|---|---|---|---|---|---|
| B1 | T0 | M11 | T11 | $P_{11}+\Sigma Lf$ | P11 |
| B2 | T0 | M12 | T12 | $P_{12}+\Sigma Lf$ | P12 |
| B3 | T0 | M13 | T13 | $P_{13}+\Sigma Lf$ | P13 |

50

DEVICE AND METHOD OF CONTROLLING HYDRAULIC DRIVE OF CONSTRUCTION MACHINERY

RELATED APPLICATION

This application is a National Stage of International Application No. PCT/JP2004/018313 filed on Dec. 8, 2004, which claims priority to JP 2003-410518, filed on Dec. 9, 2003, the entire specification claims and drawings of which are incorporated herewith by reference in their entirety.

TECHNICAL FIELD

The present invention relates to a hydraulic drive control device and method for controlling a hydraulic drive system of construction machinery such as a hydraulic shovel.

BACKGROUND ART

In construction machinery in which a plurality of work machines (for example, an arm, a bucket, a boom, a turret device, and a travel device of a hydraulic shovel) and auxiliary machines (for example, an engine cooling fan) are driven by the oil supplied under pressure from a plurality of hydraulic pumps driven by an engine, the process of setting the engine output characteristic (revolution speed and output torque) according to a selected work mode, controlling the total absorption torque (a product of discharge quantities of oil per one revolution and oil pressures)of the plural hydraulic pumps so as to obtain the predetermined characteristic, and controlling the operation point of the engine to a matching point of the output torque of the engine and the absorption torque of the hydraulic pumps is known (see, for example, Japanese Patent Application Laid-open No. 2-38630, Pages 2-9, FIGS. 1-7, FIGS. 18-21).

FIGS. 11(*a*) and (*b*) are engine output characteristic diagrams illustrating the control performed in various work modes described in Japanese Patent Application Laid-open No. 2-38630. According to Japanese Patent Application Laid-open No. 2-38630, for example, when a heavy excavation mode is selected as a work mode in a hydraulic shovel, then the position of the governor level of the engine is controlled so that the maximum target engine revolution speed (referred to hereinbelow as a high-idle revolution speed) becomes the maximum revolution speed N'A, as shown in FIG. 11(*a*), and the highest-speed regulation line LA is thereby set. Furthermore, a plurality of hydraulic pumps are controlled so as to absorb the torque on an equal horsepower characteristic AH passing through a maximum horsepower point PH on the highest-speed regulation line LA, and a total absorption torque thereof is controlled following the characteristic A'H shown the figure. The output torque of the engine and the absorption torque of the hydraulic pumps are thus matched at a horsepower point PH. Furthermore, for example, when a light excavation mode (economy mode) is selected, then a lower speed regulation line LB is set by setting the high-idle revolution speed to a lower revolution speed N'B, as shown in FIG. 11(*b*), and the total absorption torque of the hydraulic pumps is controlled along a smaller equal horsepower characteristic AS. As a result, the output torque of the engine and the absorption torque of the hydraulic pumps will be matched at the horsepower point P'S on the low-speed regulation line LB and the engine will operate at the revolution speed NB. In the heavy excavation mode, because a large horsepower can be outputted from the engine, the work can be performed efficiently. On the other hand, in the light excavation mode, because the output horsepower from the engine is decreased, fuel consumption is reduced.

DISCLOSURE OF THE INVENTION

However, in the above-described conventional control device, the aforementioned matching point moves along the regulation line and the engine revolution speed changes following the change in the output torque necessary for driving the loads such as work machines and auxiliary machines. If the engine revolution speed changes, the output flow rate of the hydraulic pump that is driven by the engine in construction machinery such as a hydraulic shovel change. Therefore, the operation speed of the work machine varies and the drive torque further changes. The resultant problem is that the operation rate or drive torque (for example, an excavation force) of the work machine changes, regardless of the operator's intentions, during the work in the same work mode, thereby decreasing operability.

Accordingly, it is an object of the present invention to conduct control so as to obtain the desired operation speed or drive torque of a work machine in construction machinery in which the work machine is driven by hydraulic pressure from a hydraulic pump driven by an engine.

The hydraulic drive control device in accordance with the present invention of a construction machine comprising an engine and a hydraulic pump for a work machine that is driven by the engine is a device comprising an operation state detector for detecting an operation state of the work machine, and a controller for receiving a signal from the operation state detector and controlling the engine and the hydraulic pump for the work machine. The controller receives a signal from the operation state detector, identifies the operation mode performed with respect to the work machine, determines an engine output torque control line and a pump torque control line having a desired matching point according to the identified operation mode so that different engine output torque control lines and different pump torque control lines are designated for different operation modes, controls an output torque of the engine based on the determined engine output torque control line, and controls an absorption torque of the hydraulic pump for the work machine based on the determined pump torque control line.

With such device for controlling hydraulic drive the output torque control line of the engine and the torque control line of the pump can vary according to the operation mode that is being implemented. The output torque of the engine is controlled along the engine output torque control line, and the absorption torque of the pump is controlled along the pump torque control line. As a result, the engine operates in a matching point of the engine output torque control line and pump torque control line. By adequately determining the engine output torque control line and pump torque control line, the engine revolution speed or output torque can be controlled in a desired manner, for example, for a constant revolution speed or a constant torque.

In one preferred mode for carrying out the invention, the controller determines the engine output torque control line and the pump torque control line so that an engine revolution speed at a matching point of the determined engine output torque control line and the determined pump torque control line assumes a substantially constant predetermined value for any identified operation mode, when the identified operation mode corresponds to any of a plurality of predetermined operation modes. As a result, the engine revolution speed is maintained at a substantially constant level and, therefore, the operation speed of the work machine is stable, even if the operation mode changes between the plurality of predetermined operation modes.

In another preferred mode for carrying out the invention, the controller determines the engine output torque control line and the pump torque control line so that a torque at a matching point of the determined engine output torque control line and the determined pump torque control line assumes a substantially constant predetermined value for any identified operation mode, when the identified operation mode corresponds to any of a plurality of predetermined operation modes. As a result, the output torque from the engine to the work machine is maintained at a substantially constant level and, therefore, the drive torque of the work machine is stable, even if the operation mode changes between the plurality of predetermined operation modes.

In yet another preferred mode for carrying out the invention, the controller determines a pump absorption horsepower according to the identified operation mode so that different pump absorption horsepower is designated for different operation modes, and controls the output torque of the engine by using the equal horsepower line of the determined pump absorption horsepower as the engine output torque control line. By adequately determining the pump absorption horsepower according to the operation mode, the operation speed or drive torque of the work machine can be stabilized even if the operation mode changes.

In another preferred mode for carrying out the invention, the construction machine further comprises a hydraulic pump for an auxiliary machine, which is driven by the engine and serves to drive an auxiliary machine (for example, an engine cooling fan) of the construction machine. The controller, on the one hand, determines the absorption horsepower of the pump for the work machine that is to be absorbed by the hydraulic pump for the work machine, according to the identified operation mode so that different absorption horsepower of the pump for the work machine is designated for different operation modes, and on the other hand, detects a predetermined state value relating to the operation of the auxiliary machine and determines the absorption horsepower of the pump for the auxiliary machine that is to be absorbed by the hydraulic pump for the auxiliary machine, according to the detected state value. Then, the controller controls the engine so that the output horsepower of the engine becomes a sum of the determined absorption horsepower of the pump for the work machine and the determined absorption horsepower of the pump for the auxiliary machine. Furthermore, the controller controls the hydraulic pump for the work machine so that the absorption torque of the hydraulic pump for the work machine follows the determined pump torque control line. Then, the controller determines a target revolution speed of the auxiliary machine according to the detected state value and controls the capacity of the pump for the auxiliary machine so that the auxiliary machine can be driven at the determined target revolution speed. As a result, a large horsepower necessary for driving the work machine can be supplied to the work machine and the operation speed or drive torque of the work machine can be stabilized even if the horsepower required for the work machine or auxiliary machine is increased or decreased. In accordance with the present invention, the operation speed or drive torque of the work machine of construction machinery is easily controlled to a desired value and operability is improved.

BRIEF DESCRIPTION OF THE DRAWINGS

FIG. 3 shows entry data of the setting table 50 and related control values that are used in the control in the active mode;

FIG. 5 shows entry data of the setting table 50 and related control values that are used in the control in the economy mode;

FIG. 10 entry data of the setting table 50 and related control values that are used in the control of the second embodiment.

BEST MODE FOR CARRYING OUT THE INVENTION

An embodiment of the device for controlling hydraulic drive in accordance with the present invention will be described below with reference to the appended drawings.

Figure 1:
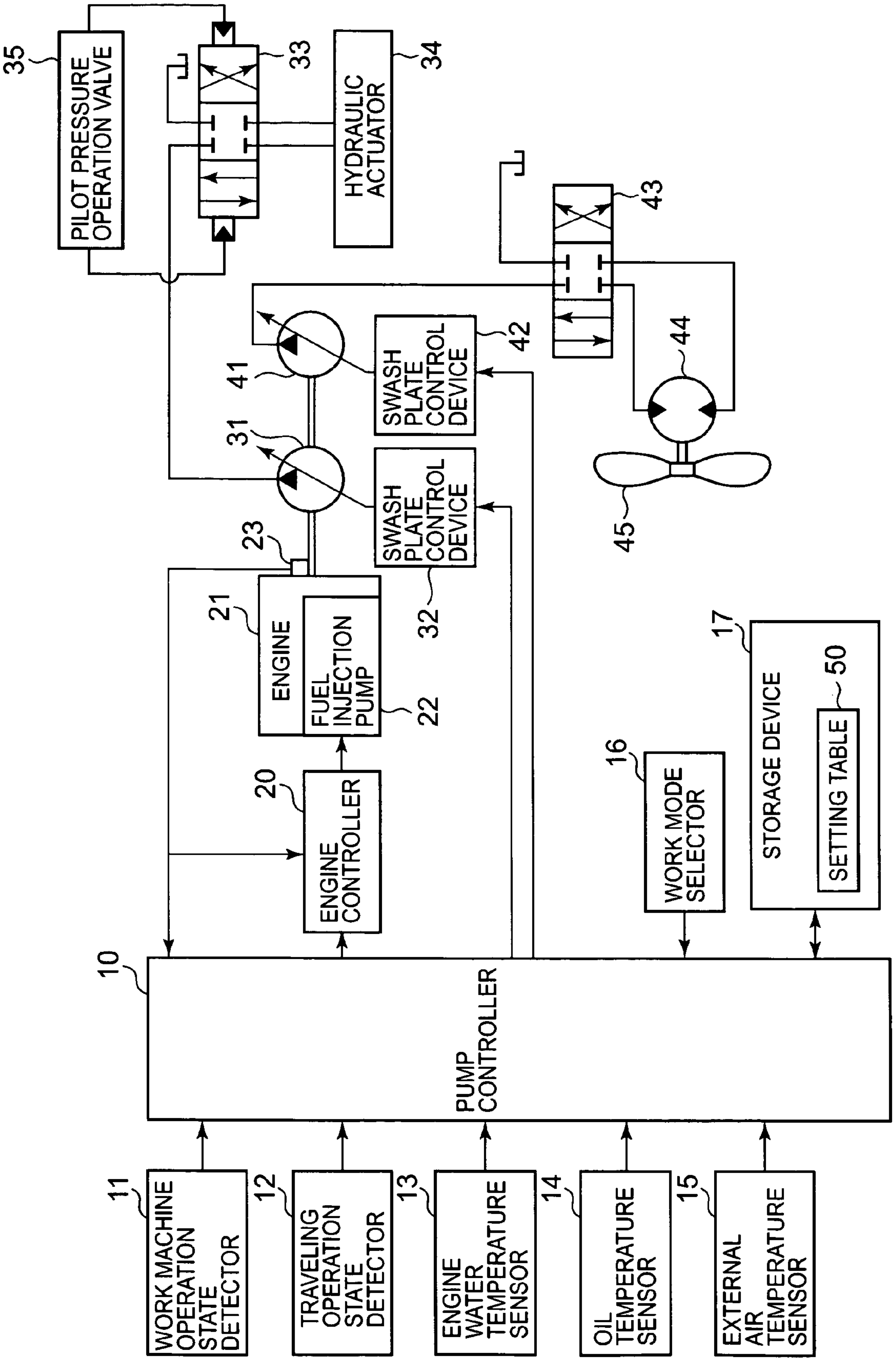
FIG. 1 is a block diagram illustrating a hardware structure of one embodiment of the device for controlling hydraulic drive in accordance with the present invention.
Figure 2:
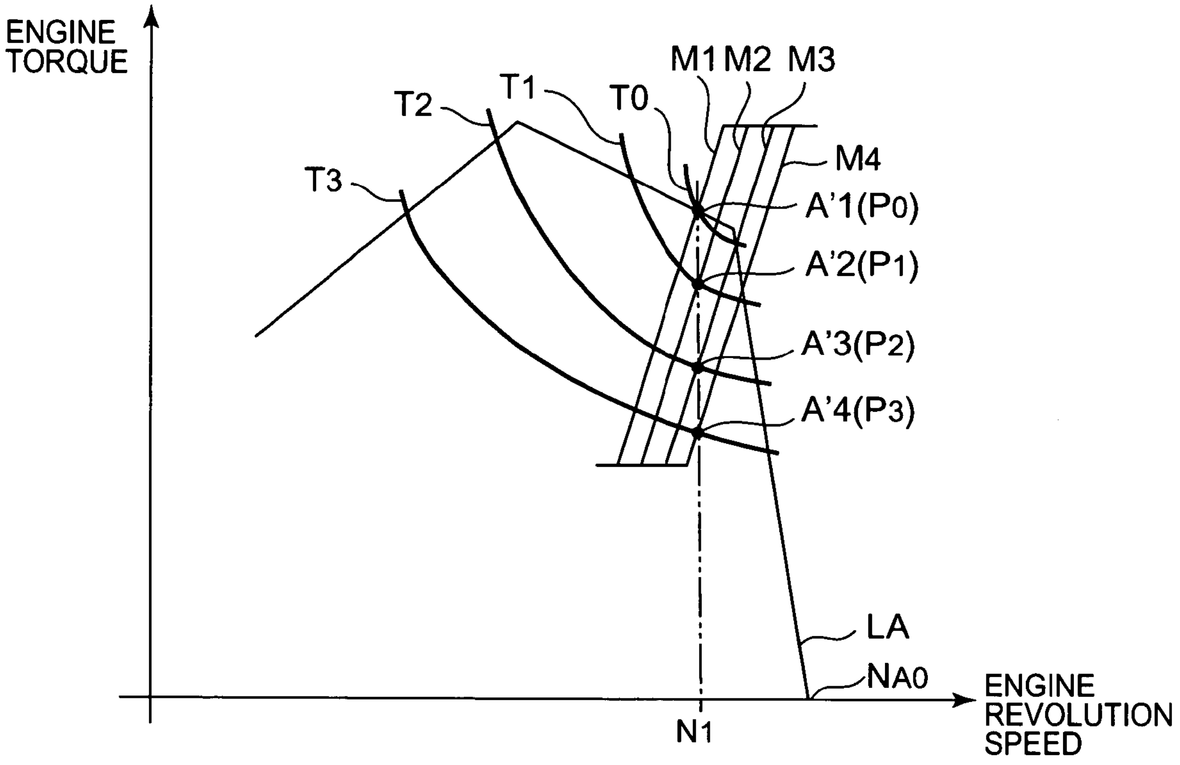
FIG. 2 shows an output characteristic of an engine and a pump for a work machine that serves to explain the control method in an active mode.

FIG. 1 is a block diagram illustrating the hardware structure of an embodiment of the hydraulic control device in accordance with the present invention. FIG. 2 is an explanatory drawing of engine output characteristic and a pump absorption torque characteristic that illustrate the operation of the hydraulic control device. First, the hardware structure will be explained with reference to FIG. 1 and FIG. 2. Here, the explanation will be conducted with reference to a hydraulic shovel as an example of a construction machine using the present invention.

As shown in FIG. 1, a hydraulic pump 31 for a work machine and a hydraulic pump 41 for an auxiliary device are linked via a power take-off device (not shown in the figure) to an output shaft of an engine 21. The oil discharged under pressure from the hydraulic pump 31 for a work machine is supplied via a direction switching valve 33 to a hydraulic actuator (for example, a hydraulic cylinder or a hydraulic motor) 34 for driving the corresponding work machine (for example, a boom, an arm, a bucket, a turret device, or a traveling device of a hydraulic shovel). An output pilot channel of a pilot pressure operation valve 35 is connected to a pilot operation section of the direction switching valve 33. The pilot pressure operation valve 35 outputs a pilot pressure corresponding to the operation quantity of an operation lever (not shown in the figure) for the work machine to the direction switching valve 33. Furthermore, the pilot discharge under pressure from the hydraulic pump 41 for a auxiliary device is supplied via a control valve 43 to a hydraulic motor 44 for driving the corresponding auxiliary device (for example, an engine cooling fan) 45.

The above-described hydraulic pumps 31, 41 are of a variable capacity type, for example, of a swash plate variable capacity type. The swash plates of the hydraulic pumps 31, 41 are driven by the swash plate control devices 32, 42, correspondingly, and those swash plate control devices 32, 42 are controlled by a pump controller 10. For example, an EPC (Electrical Pressure Control) solenoid or the device with a structure such as described in Japanese Patent Application Laid-open No. 61-81587 can be used for the swash plate control devices 32, 42. In the explanation below, the swash plate control devices 32, 42 are considered to be EPC solenoids that received an EPC current as a swash plate control signal from the controller 10.

Here, only one hydraulic pump 31 for a work machine is shown in FIG. 1, but actually a plurality of hydraulic pumps 31, 31, . . . for work machines are provided to drive a plurality of work machines (not shown in the figure such as the boom, arm, bucket, turret device, and traveling device). Furthermore, the above-described swash plate control device 32, pilot pressure operation valve 35, direction switching valve 33, and hydraulic actuator 34 are provided for each of a plurality of hydraulic pumps 31, 31, . . . for work machines. Likewise, only one hydraulic pump 41 for an auxiliary machine is shown in FIG. 1, but actually, a plurality of hydraulic pumps 41, 41, . . . for auxiliary machines are provided for driving a plurality of auxiliary machines such as cooling fans 45, 45, . . . for engine cooling or air conditioner, or specific work machine attachments, for example, such as a stirring device. Here, the auxiliary machines can include not only the cooling fans 45, 45, . . . , but also devices of other types, but the explanation below with be conducted with reference to the cooling fans 45, 45, . . . . Furthermore, the above-described swash plate control device 42, control valve 43, and hydraulic motor 44 are provided for each of a plurality of hydraulic pumps 41, 41, . . . for fans.

The pump controller 10, for example, comprises a computer device containing a microcomputer. The pump controller 10 performs information processing for controlling the capacity of the hydraulic pumps 31, 31, . . . for work machines and hydraulics pumps 41, 41, . . . for fans. Thus, the pump controller 10 determines by the below-described method the target values of the total absorption torque of a plurality of the above-mentioned hydraulic pumps 31, 31, . . . for work machines. Furthermore, the pump controller 10 distributes the target values of the total absorption torque to each hydraulic pump 31 for a work machine, determines the capacity of each hydraulic pump 31 for a work machine so that each hydraulic pump 31 for a work machine absorbs the distributed target absorption torque, and outputs a swash plate control signal (EPC current) corresponding to this capacity to each swash plate control device 32 corresponding to each hydraulic pump 31 for a work machine. Each swash plate control device 32 controls the swash plate angle of each hydraulic pump 31 for a work machine in response to the swash plate control signal (EPC current) from the pump controller 10. Furthermore, the pump controller 10 finds by the below-described method the respective target revolution speeds of the above-described plurality of fans 45, 45, . . . , finds the capacity of each hydraulic pump 41 for a fan based on each target revolution speed, and then outputs a swash plate control signal (EPC current) corresponding to this capacity to each swash plate control device 42 corresponding to each hydraulic pump 41 for a fan. Each swash plate control device 42 controls the swash plate angle of each hydraulic pump 41 for a fan in response to the swash plate control signal (EPC current) from the pump controller 10. Furthermore, the pump controller 10 also performs information processing for outputting an engine horsepower control command to an engine controller 20 as described hereinbelow.

The engine 21 is provided with a fuel injection pump 22 for regulating the fuel injection quantity and a revolution speed sensor 23 for detecting the engine revolution speed. The fuel injection pump 22 is controlled by the injection quantity control signal from the engine controller 20. The engine controller 20, for example, comprises a computer device containing a microcomputer. The engine controller 20 controls the fuel injection quantity (throttle opening degree) of the fuel injection pump 22 so as to attain the engine horsepower indicated by the pump controller 10 in response to the engine horsepower control command supplied from the pump controller 10, while monitoring the engine revolution speed returned by feedback from the revolution speed sensor 23. By the fuel injection quantity control from the engine controller 20, the output horsepower (revolution speed multiplied by the output torque) of the engine 21 is controlled so as to follow the equal-horsepower characteristic curve corresponding to the total horsepower necessary for all the hydraulic pumps 31, 31, . . . , 41, 41, . . . driven by the engine 21.

The output of a work machine operation state detector 11 for detecting the operation state of a work machine such as the boom, arm, bucket, and turret device is inputted into the pump controller 10. The work machine operation state detector 11, for example, comprises a pressure switch that is turned on if a pressure equal to or higher than the predetermined pressure is applied to an output pilot channel from each pilot pressure operation valve 35 for each work machine. Based on the ON/OFF state of the pressure switch, the pump controller 10 determines whether or not each work machine is being operated. Alternatively, the work machine operation state detector 11 comprises a pressure sensor for detecting the pilot pressure of the output pilot channel of the pilot pressure operation valve 35, and the pump controller 10 may check whether or not the detected pressure of the pressure sensor is higher than the predetermined pressure and may determine that the work machine is presently operated when the detected pressure is equal to or higher than the predetermined pressure. Based on the signal from the work machine operation state detector 11, the pump controller 10 identifies the type of operation (for example, turret operation, boom rise operation, and excavation operation) presently performed for each work machine.

Furthermore, the output of a traveling operation state detector 12 for detecting the operation state of the traveling device of all the work machines is also inputted into the pump controller 10. The traveling operation state detector 12, for example, comprises a pressure switch or pressure sensor that is similar to the above-described unit and coupled to the output pilot channel from the pilot pressure operation valve 35 for the traveling machine, and the pump controller 10 may determine that the traveling machine is presently operated if the pilot pressure for traveling operation is equal to or higher than the predetermined pressure. Based on the signal from the traveling operation state detector 12, the pump controller 10 identifies the operation type (for example, whether the vehicle travels forward or rearward, what is the speed level) that is presently performed with respect to the traveling device.

Furthermore, an engine water temperature sensor 13 is mounted on a cooling water channel (not shown in the figure) of the engine 21. An oil temperature sensor 14 is mounted on a drain channel (not shown in the figure) of the hydraulic pump 31. An external air temperature sensor 15 is arranged in a duct of cooling air supplied from a fan 45 for engine cooling to the engine 21 or a radiator (not shown in the figure). The detection signals of those sensors 13, 14, 15 are also inputted into the pump controller 10.

Furthermore, a work mode selector 16, for example, such as a switch, for enabling the operator to select a work mode (work policy or implementation type) is provided on a control panel (not shown in the figure) inside an operator's cab of the hydraulic shovel. In the explanation below, for example, two types of the work mode: an active mode and an economy mode will be assumed. The difference between the active mode and the economy mode is in that the maximum horsepower that can be outputted from the engine 21 is different. As will be described below, in the active mode, the engine 21 is controlled so as to enable the output of horsepower higher than that in the economy model. The active mode is suitable for efficiently conducting such work as excavating and cargo handling, whereas the economy mode is suitable for reducing fuel consumption. The output of the work mode selector 16 is inputted into the pump controller 10, and the pump controller 10 recognizes which of the active mode and economy mode has been selected.

The pump controller 10 comprises a nonvolatile memory device 17 that stores a setting table 50 where a variety of data settings are described, those settings being used for controlling the horsepower of the engine 21 and the capacity of the hydraulic pumps 31, 31, . . . , 41, 41, . . . . As will be described hereinbelow in greater detail, the pump controller 10 identifies the work mode (in other words, an active mode or an economy mode) that is presently selected and the type of operation that is presently performed with respect to the boom, arm, bucket, turret device, and traveling device (for example, which from among the turret operation, boom rise operation, and excavation operation is presently performed) based on the input signals from the work machine operation detector 11, traveling operation detector 12, and work mode selector 16. Further, the pump controller 10 calculates the total horsepower (the total horsepower that is to be absorbed by the hydraulic pumps 31, 31, . . . for work machines) that is to be supplied to the hydraulic pumps 31, 31, . . . for work machines, with reference to the setting table 50 according to the identified work mode and operation type. Thus, definition data of a plurality of engine output torque control lines (for example, T1, T2, T3, T4, and T5 shown in FIG. 2 and FIG. 4) that are associated with various combinations (each combination will be referred to hereinbelow as "operation mode") of work modes and operation types are entered into the setting table 50. In the present embodiment, by way of an example, the definition data of the engine output torque control lines are the data indicating a plurality of horsepower values (for example, P1, P2, P3, P4, and P5 shown in FIG. 2, and FIG. 4). In other words, each engine output torque control line is defined as an equal horsepower line of the corresponding horsepower value. One horsepower value corresponding to the present work mode and operation type is selected by the pump controller 10 as a total absorption horsepower of the hydraulic pumps 31, 31, . . . for work machines from amongst those engine output torque control lines, that is, horsepower values. Furthermore, the pump controller 10 calculates the total horsepower (total horsepower that is to be absorbed by the hydraulic pumps 41, 41, . . . for cooling fans) that is to be presently supplied to the hydraulic pumps 41, 41, . . . for cooling fans based on the input signals from the above-described temperature sensors 13, 14, 15. The pump controller 10 then calculates the target output horsepower of the engine 21 by adding up the calculated total absorption horsepower of the hydraulic pumps 31, 31, . . . for work machines and the total absorption horsepower of the hydraulic pumps 41, 41, . . . for cooling fans, generates a horsepower control command for controlling the output horsepower of the engine 21 to the target output horsepower, and outputs this command to the engine controller 20. The engine controller 20 controls the fuel injection quantity of the engine 21 in a substantially stepless, that is, continuous manner in response to the horsepower control command. As a result, the engine 21 outputs the horsepower equivalent to the aforementioned target output horsepower.

Furthermore, the pump controller 10 determines one pump torque control line for controlling the total absorption torque of the hydraulic pumps 31, 31, . . . for work machines with reference to the setting table 50 according to the identified operation mode (combination of work mode and operation type). Thus, definition data of a plurality of pump torque control lines (for example, M1, M2, M3, M4, M5, and M6 shown in FIG. 2 and FIG. 4) associated with each of a variety of operation modes are entered into the setting table 50, and one pump torque control line corresponding to the present operation mode is selected by the pump controller 10 from amongst those pump torque control lines. The pump controller 10 then determines the target value of the total absorption torque of the hydraulic pumps 31, 31, . . . for work machines correspondingly to the engine revolution speed or other factors according to the selected pump torque control line and distributes this total value of the total absorption torque to a plurality of hydraulic pumps 31, 31, . . . for work machines, thereby determining the target value of the absorption torque of each hydraulic pump 31 for a work machine. Distribution according to the respective average oil pressure of the hydraulic pumps 31, 31, . . . for work machines or distribution by the distribution ratio predetermined for each pump may be used as the distribution modes. The pump controller 10 controls the capacity (swash plate angle) of each hydraulic pump 31 for a work machine so that each hydraulic pump 31 for a work machine absorbs the distributed target value of the absorption torque.

Furthermore, the pump controller 10 determines the target revolution speed of each cooling fan 45 based on the input signals from the above-described temperature sensors 13, 14, 15 and calculates the target capacity of each hydraulic pump 41 for cooling fans in order to drive each cooling fan 45 at this target revolution speed according to the present engine revolution speed. Furthermore, the pump controller 10 controls the capacity (swash plate angle) of each hydraulic pump 41 for a cooling fan so that the target capacity is assumed.

Under such control, the engine 21 will be started close to the point where the output torque of the engine 21 and the total absorption torque of all the hydraulic pumps 31, 31, . . . , 41, 41, . . . match each other. Of the output horsepower of the engine 21 in the vicinity of this matching point, the portion supplied to the hydraulic pumps 41, 41, . . . for cooling fans is controlled to a value substantially equal to the total absorption horsepower of the hydraulic fans 41, 41, . . . for cooling fans that was calculated as described hereinabove. On the other hand, of the output horsepower of the engine 21 in the vicinity of the matching point, the portion supplied to the hydraulic pumps 31, 31, . . . for work machines almost matches the horsepower value corresponding to the engine output torque line selected from the setting table 50 according to the present operation mode. Furthermore, the total absorption torque of the hydraulic pumps 31, 31, . . . for work machines, is controlled so as to follow the pump torque control line selected from the setting table 50 correspondingly to the present operation mode. Therefore, the matching point is positioned at the intersection of the engine output torque line and the pump torque control line selected from the setting table 50. Here, the aforementioned plurality of engine output torque lines and pump torque control lines entered into the setting table 50 are set so as to cross and match in the point of the engine revolution speed substantially equal in the same work mode, even if the operation modes are different. As a result, as long as the same work mode is selected, the engine 21 can continue operate at substantially the same revolution speed even if the operator performs different operations with respect to the work machine or even if the target revolution speed of the cooling fans 45, 45, . . . vary according to the change in temperature.

The above-described control method will be explained hereinbelow in greater detail with reference to FIG. 2 to FIG. 5.

Figure 4:
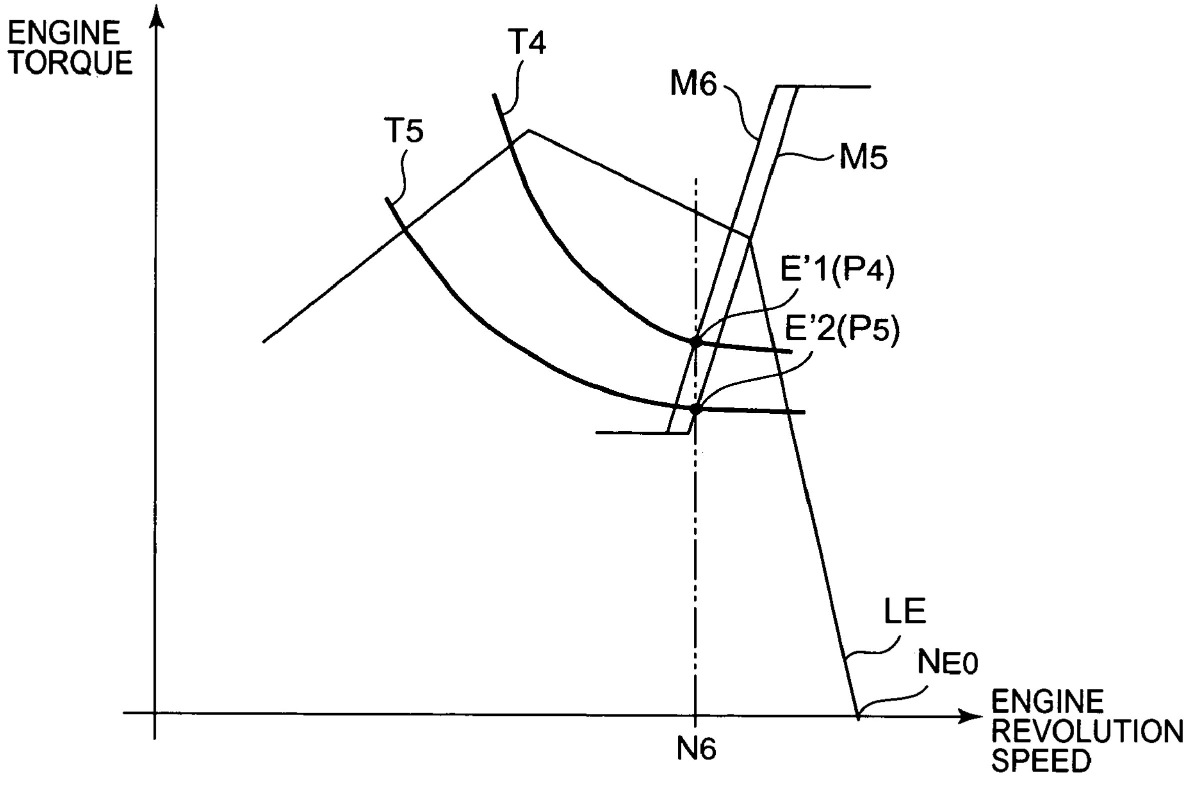
FIG. 4 shows an output characteristic of an engine and a pump for a work machine that serves to explain the control method in an economy mode.

As described hereinabove, work modes of two types, that is, an active mode for a heavy load and an economy mode for a light load are assumed. FIG. 2 shows an output characteristic of the engine and the pumps for a work machine, this characteristic serving to explain the control method in the active mode. FIG. 3 shows the entry data of the setting table 50 and the related control values that are used by the control in the active mode. FIG. 4 shows an output characteristic of the engine and the pump for a work machine, this characteristic serving to explain the control method in the economy mode. FIG. 5 shows the entry data of the setting table 50 and the related control values that are used by the control in the economy mode.

First, the control in the active mode will be explained with reference to FIG. 2 and FIG. 3.

In the active mode, as shown in the leftmost column in FIG. 3, the types of operations that can be performed with respect to the work machine are classified, for example, into operation modes A1-A4 of four types, and those operation modes A1-A4 differ depending on the horsepower that is to be provided to the hydraulic pump 31 for a work machine. In FIG. 3, the operation mode A1 shown in the uppermost line is an operation type in which the largest horsepower is to be provided to the hydraulic pump 31 for a work machine, the horsepower that is to be provided to the hydraulic pump 31 for a work machine successively decreases with the transition to the operation modes of the lower lines, and the horsepower that is to be provided is the lowest in the operation mode A4 shown in the lowermost line. The pump controller 10 judges which of the operation modes A1-A4 has presently been selected based on the detection signals of the work machine operation detector 11 and traveling operation detector 12 shown in FIG. 1.

As shown in FIG. 3, different pump torque control lines (characteristic lines that have to be followed by the total absorption torque of the pumps 31, 31, . . . for a work machine) M1-M4 and different engine output torque lines T0-T3 are associated with respective different operation modes A1-A4 and entered into the setting table 50. Those pump torque control lines M1-M4 and engine output torque lines T0-T3 are for example such as shown in FIG. 2.

As shown in FIG. 2, the engine output torque lines T0-T3 are determined by assuming that the respective engine output torques are the decreasing functions of the engine revolution speed. For example, in the present embodiment, those lines are equal horsepower lines corresponding to respective different horsepower values P0-P3. Here, the horsepower value P0 is equivalent to the maximum horsepower that can be outputted by the engine 21. In the setting table 50, the engine output torque lines T0-T3 can be determined, for example, by the percentage of the horsepower P0-P3 corresponding to each line in the maximum output horsepower P0 of the engine, that is, T0 will be 100%, T1-90%, T2-80%, and T3-70%. On the other hand, in each pump torque control line M1-M4, the engine torque is a decreasing function of the engine revolution speed, so as to facilitate matching with each engine output torque line T0-T3. It is important to note that the engine revolution speed (matching revolution speed) in the operation point in which the engine output torque lines T0-T3 and the pump torque control lines M1-M4 corresponding to respective operation modes A1-A4 intersect (in other words, match) is the same value N1 for any operation mode A1-A4. By conducting the above-described control by using the combinations of the pump torque control lines M1-M4 and the engine output torque lines T0-T3 that were set as described above, a substantially constant revolution speed of the engine 21 will be maintained in the range close to the matching revolution speed N1, even if the operation mode is switched.

For example, when the operation mode A2 is performed (for example, when the turret operation, and boom rise operation are performed simultaneously and a high engine output horsepower is required), the pump torque control line M2 and the engine output torque line T1 are selected from the setting table 50 shown in FIG. 3. The selected pump torque control line M2 means a characteristic line that is to be followed by the total absorption torque of the hydraulic pumps 31, 31, . . . for work machines. The selected engine output torque line T1 means the total value (in other words, the total value of the torque necessary for driving all the work machines) of the torque that is to be absorbed by the pumps 31, 31, . . . for work machines. Furthermore, in addition to the torque necessary for driving the work machines, an auxiliary torque for driving the auxiliary machines such as cooling fans 45, 45, . . . is necessary. Here, the horsepower ΣLf for driving the auxiliary machine is calculated based on the present actuation oil temperature and engine water temperature (here, ΣLf means a total horsepower obtained by adding up the horsepower Lf1, Lf2, . . . required by a plurality of cooling fans 45, 45, . . . ). Further, as shown in the right column in FIG. 3, the engine output horsepower P1 at the matching point A'2 shown in FIG. 2 (in other words, an engine output horsepower for driving the work machine) and the calculated engine output horsepower ΣLf for driving the auxiliary machine are added up, and the sum P1+ΣLf thus obtained is set as a target value of the engine output horsepower. The control of the output horsepower of the engine 21 is conducted so that the actual output horsepower of the engine 21 matches the target value P1+ΣLf. At the same time, the respective capacity (swash plate angle) of the hydraulic pumps 31, 31, . . . for work machines is controlled according to the engine revolution speed and other factors so that the total absorption torque of the pumps 31, 31, . . . for the work machines follows the aforementioned selected pump torque control line M1. Furthermore, at the same time, the capacity (swash plate angle) of the hydraulic pumps 41, 41, . . . for a cooling fans is controlled so that the cooling fans 45, 45, . . . are driven at a target revolution speed corresponding to the present work oil temperature, engine water temperature, or external air temperature. As a result, when an operation mode A2 is implemented, as shown in FIG. 2, the engine 21 operates close to the operation point A'2 where the engine output torque line T1 for during the work machine and the pump torque control line M2 match each other. Therefore, the revolution speed of the engine 21 becomes close to the matching revolution speed N1.

Here, as shown in FIG. 3, in the operation mode A2, when the horsepower ΣLf for driving the auxiliary machine is equal to or higher than the target value Ls (in other words, the sum P1+ΣLf exceeds the maximum horsepower P0 that can be outputted), the target value of the engine output horsepower is set to the maximum horsepower P0, regardless of the horsepower ΣLf for driving the auxiliary machine.

Furthermore, when an operation mode A3 is implemented (for example, when the turning and arm excavation orientation are performed simultaneously and the intermediate horsepower is required), a pump torque control line M3 and an engine output torque line T2 are selected from the setting table 50 shown in FIG. 3. Here, in the same manner as described above, the output horsepower of the engine 21 at the matching point is controlled to assume the target value P2+ΣLf thereof and, at the same time, the total absorption torque of the hydraulic pumps 31, 31, . . . for work machines are controlled so as to follow the pump torque control line M2. Furthermore, the capacity of the hydraulic pumps 41, 41, . . . for cooling fans is controlled in a similar manner. As a result, the engine 21 operates in the vicinity of the matching point A'3 shown in FIG. 2 and, therefore, the revolution speed of the engine 21 is close to the aforementioned matching revolution speed N1.

When the operation mode A4 is implemented (when the sufficient engine output torque is less than the above-described value), a pump torque control line M4 and an engine output torque control line T3 are selected from the setting table 50 shown in FIG. 3. The control is then conducted in the same manner as described above, the engine 21 operates in the vicinity of a matching point A'4 shown in FIG. 2, and the revolution speed of the engine 21 thus becomes close to the matching revolution speed N1.

As described hereinabove, even if the operation mode is changed, the revolution speed of the engine 21 is maintained at a substantially constant level in the vicinity of the matching revolution speed N1 shown in FIG. 3. Furthermore, even if the horsepower ΣLf for an auxiliary machine changes, the revolution speed of the engine 21 still can be maintained at a substantially constant level in the vicinity of the matching revolution speed N1.

The control in the economy mode will be explained below with reference to FIG. 4 and FIG. 5.

As shown in FIG. 5, in the economy mode, the operation types of the work machine are classified, for example, into two operation modes E1, E2. Those operation modes E1, E2 differ by the horsepower for driving the work machine, and the horsepower for driving the work machine in the operation mode E2 is lower than that of the operation mode E1. Different pump torque control lines M5, M6 and different engine output torque control lines T4, T5 are entered in the setting table 50 for the operation modes E1, E2, respectively. Here, the pump torque control lines M5, M6 for the economy mode are, for example, as shown in FIG. 4, and have characteristics identical or close to those of the pump torque control lines M1, M2 for the active mode shown in FIG. 2. Furthermore, the engine output torque control lines T4, T5 for the economy mode are, for example, as shown in FIG. 4, and have characteristics identical or close to those of the engine output torque control lines T2, T3 for the active mode shown in FIG. 2. For example, in the present embodiment, the engine output torque control lines T4, T5 are equal horsepower lines corresponding to horsepower values P4, P5.

Here, it is noteworthy that, as shown in FIG. 4, the engine revolution speed in matching points E'1, E'2 where the pump torque control lines M5, M6 and the engine output torque control lines T4, T5 intersect is constant at the revolution speed N6. This matching revolution speed N6 is lower by the predetermined value (for example, about 100 rpm) than the matching revolution speed N1 in the active mode shown in FIG. 2.

When either of the operation modes E1, E2 is implemented in the economy mode, the control is conducted by the same method as was employed when either of the operation modes A1-A4 was implemented in the above-described active mode. As a result, in the operation mode E1, the engine 21 operates in the vicinity of the matching point E'1 shown in FIG. 4, and in the operation mode E2, the engine operates in the vicinity of the matching point E'2 shown in FIG. 4. Therefore, even if the operation mode is switched between the operation modes E1, E2, and even if the horsepower ΣLf for driving an auxiliary machine changes, the revolution speed of the engine 21 is maintained at a substantially constant level in the vicinity of the aforementioned matching revolution speed N6.

Here, a method for calculating the engine output horsepower for driving the auxiliary machines such as the above-described cooling fans 45, 45, . . . will be described. A fan 45 for engine cooling will be explained by way of an example. In the pump controller 10, the target revolution speed of the cooling fan 45 necessary to cool the engine 21 is calculated based on the present engine water temperature, work oil temperature, external air temperature, and engine revolution speed detected by the engine water temperature sensor 13, oil temperature sensor 14, external air temperature sensor 15, and revolution speed sensor 23 shown in FIG. 1. A specific method for calculating the target revolution speed will be explained below with reference to FIG. 8. The horsepower Lf that is to be supplied to the cooling fan 45 is found from the target revolution speed, for example, by the calculation method of "$Lf=pfan \cdot qfan/450/\eta t/\eta v/0.98$". In this calculation formula, pfan is an oil pressure that is to be applied to the hydraulic motor 44 for the cooling fan 45, qfan is a capacity of the hydraulic pump 41 for the cooling fan that corresponds to the target revolution speed, ηt is a torque efficiency, and ηv is a capacity efficiency. The necessary horsepower Lf is also calculated by the same method with respect to other auxiliary machines (for example, a cooling fan of an air conditioner) other than the fan 45 for cooling the engine. The necessary horsepower Lf of all the auxiliary machines that was thus calculated is added up and the total horsepower ΣLf for driving the auxiliary machines is found. Instead of the above-described calculation, a lookup table defining the correlation of the engine water temperature, work oil temperature, external air temperature, and engine revolution speed with the fan flow rate and fan revolution speed, or a lookup table defining the correlation of the fan revolution speed with the fan drive horsepower is stored in advance in the storage device 17 shown in FIG. 1, and the fan drive horsepower corresponding to the present work oil temperature and water temperature may be found by referring to those lookup tables.

The above-described control is implemented when the engine 21 is not in the overheated state (this state is judged by checking whether the temperature detected by the oil temperature sensor 14 exceeds the predetermined temperature T0). When the engine 21 is in the overheated state, well-known other control can be conducted.

Figure 6:
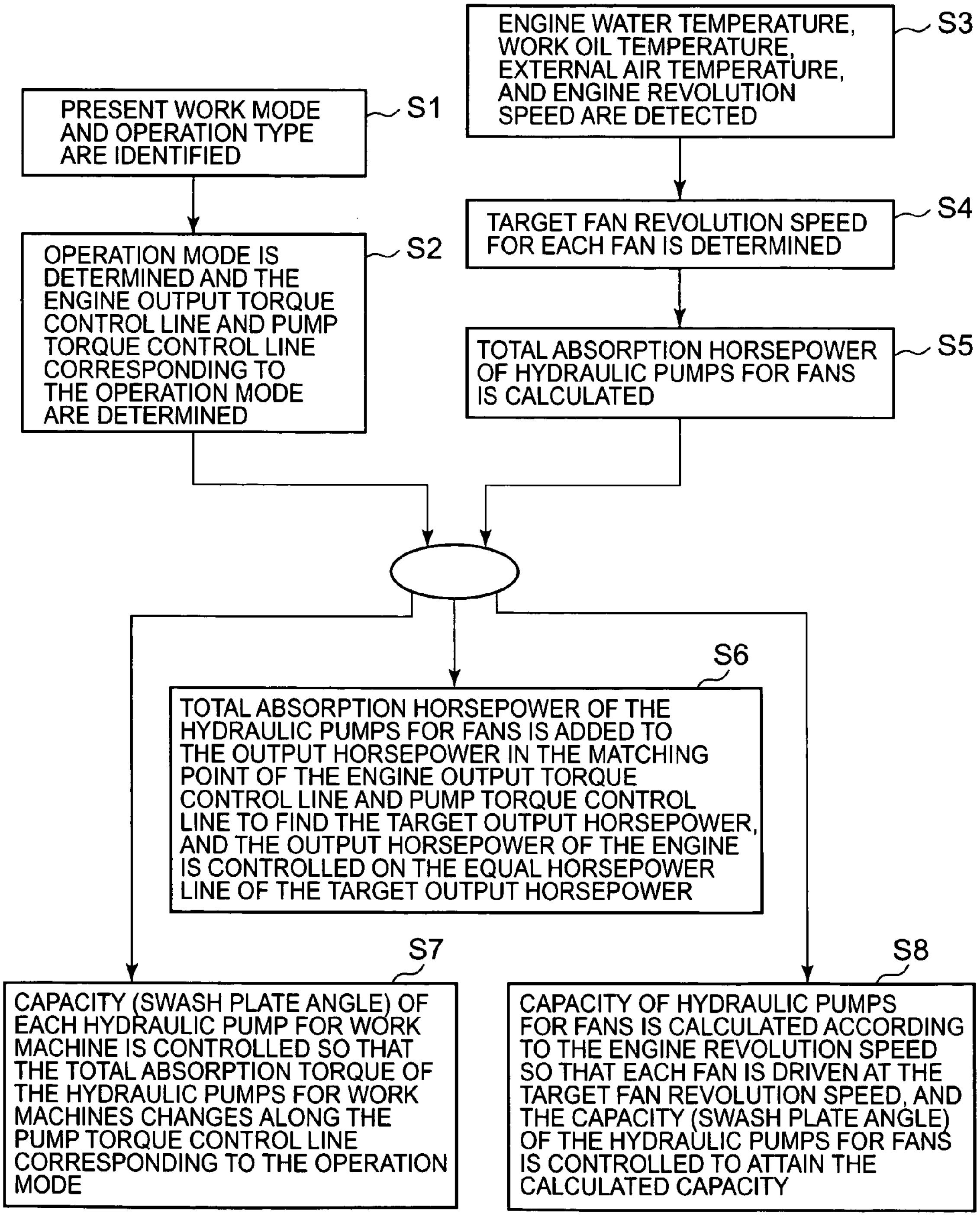
FIG. 6 is a flowchart illustrating the control processing.

FIG. 6 is a processing procedure of the above-described control carried out by the pump controller 10 and engine controller 20.

As shown in FIG. 6, in step S1, the pump controller 10 fetches signals from the work mode selector 16, work machine operation state detector 11, and traveling operation state detector 12 and identifies which work mode is presently selected and which operation type is presently implemented in a work machine such as a bucket, an arm, a boom, a turret, and a traveling unit. Then, in step S2, it is determined which operation mode (which from among A1-A8, E1-E5 shown in FIG. 3 and FIG. 5) corresponds to the selected work mode and operation type. When the determined operation mode is any of the operation modes A1-A4, E1-E2, an engine output torque control line (any of T0-T5 shown in FIG. 3 and FIG. 5)

and pump torque control line (any of M1-M6 shown in FIG. 3 and FIG. 5) corresponding to the operation mode are selected from the setting table 50.

Furthermore, the steps S3-S5 are executed in parallel with the steps S1-S2. In step S3, the pump controller 10 fetches signals from the engine water temperature sensor 13, oil temperature sensor 14, external air temperature sensor 15, and revolution speed sensor 23 and detects the engine water temperature, work oil temperature, external air temperature, and engine revolution speed. The revolution speed of each cooling fan 45 is thereafter determined based on those detected values in step S4. In short, the operation speed or power of each auxiliary machine is determined. Then, in step S5, the total absorption horsepower ΣLf of all the hydraulic pumps 41, 41, . . . for cooling fans is found by the method that has already been explained above, based on the target revolution speed (that is, the operation speed or power of all the auxiliary machines) of all the cooling fans 45, 45, . . . that has been determined.

Then, in step S6, the target output horsepower of the engine 21 is determined by adding up the engine output horsepower (any of P0-P5) corresponding to the engine output torque control line (any of T0-T5) that was determined in step S2 and the total absorption horsepower ΣLf of the hydraulic pumps 41, 41, . . . for cooling fans that was determined in step S5, and a horsepower control command corresponding to the determined target output horsepower is supplied to the engine controller 20. The engine controller 20 drives the engine 21 on the equal horsepower line of the target output horsepower by controlling the fuel injection quantity of the engine 21 according to the horsepower control command.

In step S7, the total absorption torque of the hydraulic pumps 31, 31, . . . for work machines is controlled correspondingly to the engine revolution speed on the pump torque control line (any of M1-M6) that was selected in step S2. As for the method of how to control the capacity (swash plate angle) of the hydraulic pump 31 for a work machine in order to control the total absorption torque of the hydraulic pumps 31, 31, . . . for work machines on one selected pomp torque control like, a well-known method can be used for this purpose. Thus, the target value of the total absorption torque of the hydraulic pumps 31, 31, . . . for work machines on the selected pump torque control line is determined according to the engine revolution speed and other factors, the target value of the total absorption torque is distributed to each of the hydraulic pumps 31, 31, . . . for work machines, and then the capacity (swash plate angle) of each hydraulic pump 31 for a work machine is controlled according to the oil pressure of each hydraulic pump 31 for a work machine or other factor so that the absorption torque of each hydraulic pump 31 for a work machine becomes the target value of the absorption torque distributed thereto.

Further, in step S8, the target capacity of each hydraulic pump 41 for a cooling fan is calculated according to the engine revolution speed, and the capacity (swash plate angle) of each hydraulic pump 41 for a cooling fan is controlled to obtain the calculated capacity, so that each cooling fan 45 be driven at the target revolution speed determined in step S3 (in other words, so that each auxiliary machine be operated at an operation speed or power determined in step S3). A horsepower that is substantially equal to the calculated value ΣLf founding step S5 will thus be absorbed by all the hydraulic pumps for cooling fans (hydraulic pumps for auxiliary machines) 41, 41, . . . . Therefore, a horsepower obtained by subtracting this total absorption horsepower (≈ΣLf) from the output horsepower of the engine 21, that is, a horsepower that is substantially equal to the absorption horsepower that was selected from the setting table 50 in step S2 will be supplied to the hydraulic pumps 31, 31, . . . for work machines.

Figure 7:
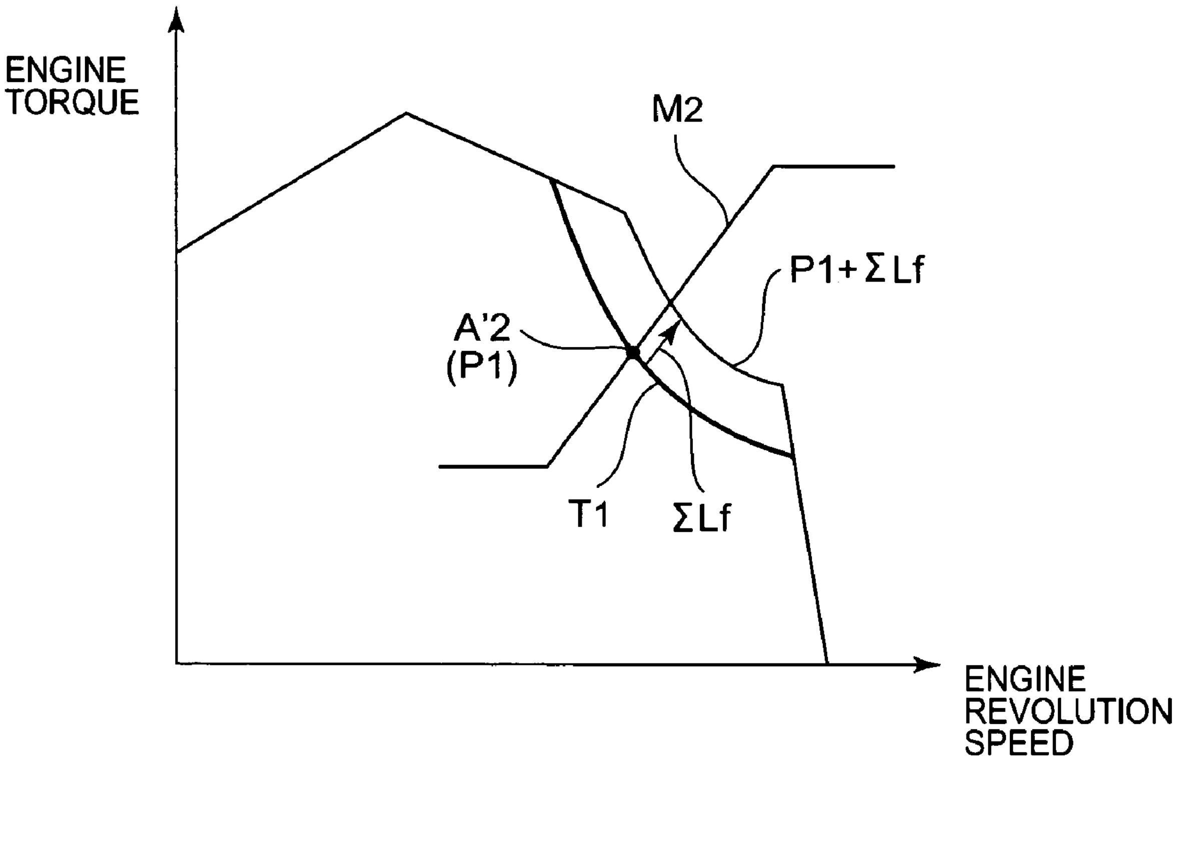
FIG. 7 explains the matching pattern.

A matching pattern based on the above-described control is explained in FIG. 7.

For example, the case where the present operation mode is A2 will be assumed. In this case, the engine output torque control line T1 (for example, an equal horsepower line matching the horsepower value P1) and the pump torque control line M2 that corresponds to the operation mode A2 are selected. The total absorption horsepower ΣLf of the hydraulic pumps 41, 41, . . . for cooling fans that was calculated is added to the horsepower value P1 at the matching point A'2 of the two lines T1 and M2, and the target output horsepower P1+ΣLf is found. The engine 21 is controlled so as to operate on the equal horsepower line corresponding to the target output horsepower P1+ΣLf shown in FIG. 7. Furthermore, the hydraulic pumps 41, 41, . . . for cooling fans are operated so as to absorb the horsepower ΣLf as a total. Therefore, the horsepower ΣLf which is a portion of the output horsepower P1+ΣLf of the engine 21 at the matching point A'2 is absorbed by the hydraulic pumps 41, 41, . . . for cooling fans, and the remaining horsepower P1 is supplied to the work pumps 31, 31, . . . . Therefore, with respect to the work pumps 31, 31, . . . , the engine 21 will operate on the engine output torque control line T1 (equal horsepower line corresponding to horsepower P1) shown in FIG. 7. Further, the total absorption torque of the work pumps 31, 31, . . . is controlled on the torque control line M2. As a result, The operation of engine 21 is stable at the matching point A'2 where the engine output torque control line T1 and torque control line M2 intersect.

In the active mode, as shown in FIG. 2, the matching points A'1-A'4 corresponding to the operation modes A1-A4 are selected in positions with the same engine revolution speed N1. In the economy mode, as shown in FIG. 4, the matching points E'1-E'2 corresponding to the operation modes E1-E2 are selected in the positions with the same engine revolution speed N6. Therefore, even if the operation type of the work machine changes between the operation modes A1-A4 in the active mode or even if it changes between the operation modes E1 and E2 in the economy mode, the engine 21 will continue operating at a substantially constant revolution speed. Furthermore, because the target output horsepower of the engine 21 includes the calculated total value ΣLf of the horsepower necessary to drive the cooling fans 45, 45, . . . , even if the horsepower necessary to drive the cooling fans 45, 45, . . . increases, the engine 21 will continue operating at a substantially constant revolution speed. As a result, good operability can be obtained.

Figure 8:
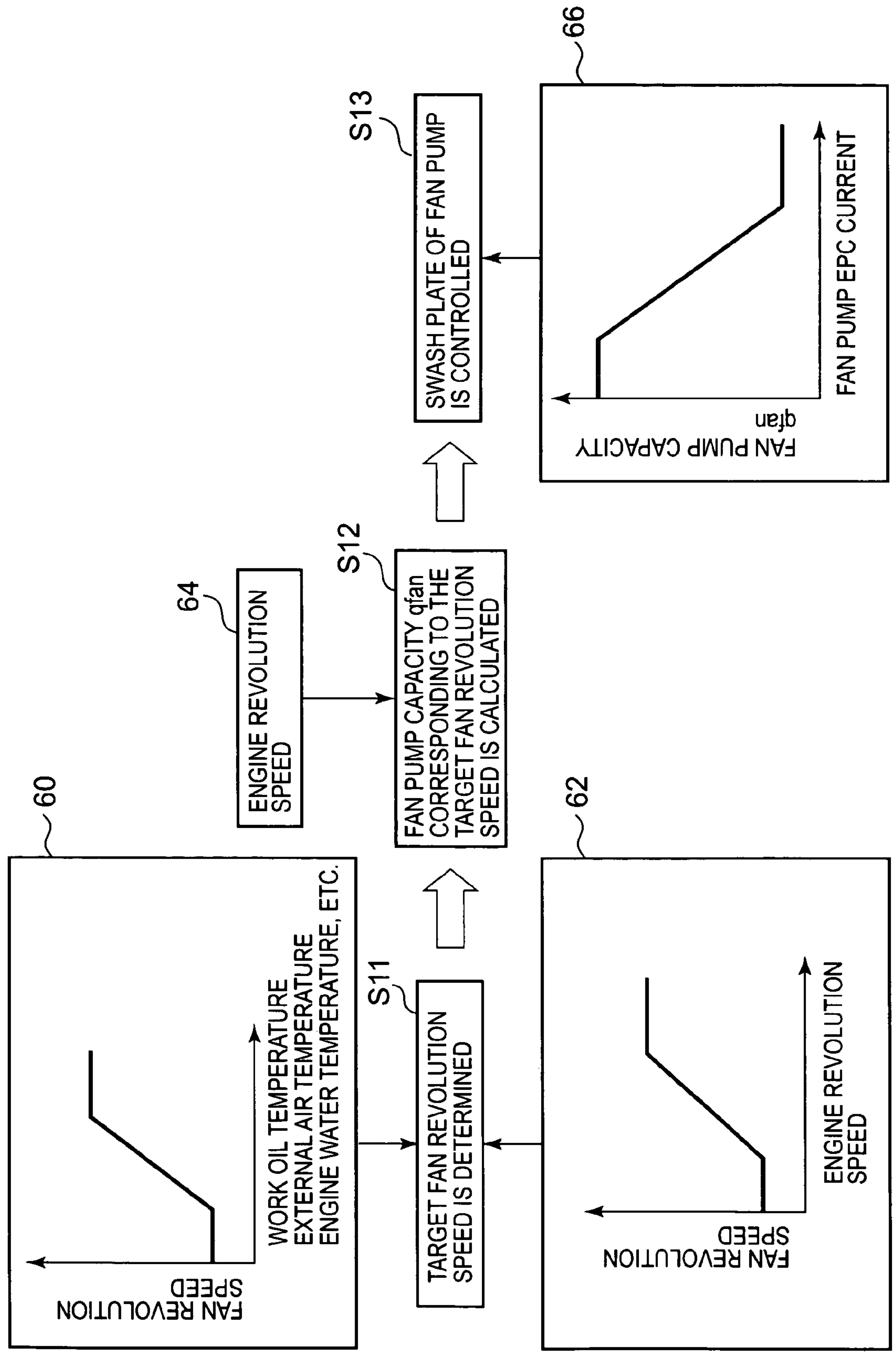
FIG. 8 is a flowchart illustrating the control principle of a hydraulic pump for a cooling fan.

FIG. 8 shows a specific example of control processing of the capacity of the above-described hydraulic pumps 41, 41, . . . for cooling fans.

Step S11 shown in FIG. 8 corresponds to steps S3-S4 shown in FIG. 6. Here, the target revolution speed of the hydraulic pump 41 for a cooling fan is determined. Thus, lookup tables 60 and 62 shown in FIG. 8 are stored in the pump controller 10. The preferred fan revolution speed is defined in the lookup table 60 correspondingly to the engine water temperature, work oil temperature, and external air temperature. On the other hand, the preferred fan revolution speed is defined in the lookup table 62 correspondingly to the engine revolution speed. The fan revolution speed is set entirely on the safe side in both lookup tables 60, 62. In step S11, the preferred fan revolution speeds corresponding to each of the present engine water temperature, work oil temperature, and external air temperature are read out from the lookup table 60, the preferred fan revolution speed corresponding to the present engine revolution speed is read out from the lookup table 62, and the lowest of those read-out fan revolution speeds is determined as a target revolution speed of the fan 45.

Then, in step S12, the capacity qfan of each hydraulic pump 41 for cooling fan corresponding to the target revolution speed of each cooling fan 45 is calculated according to the present engine revolution speed 64. This calculation is conducted, for example, by the following formula.

(Fan motor capacity)×(fan target revolution speed)/(fan motor capacity efficiency)=(engine revolution speed)×(capacity *q*fan of hydraulic pump for cooling fan)×(pump shaft reduction ratio)×(pump capacity efficiency)

Then, in step S13, the swash plate angle of each hydraulic pump 41 for a cooling fan is controlled so that the capacity of each hydraulic pump 41 for a cooling fan becomes the respective calculated capacity qfan. Thus, a lookup table 64 defining the relationship between the capacity qfan and the EPC current (swash plate control signal) value, such as shown in FIG. 8, is stored in the pump controller 10, the EPC current (swash plate control signal) value corresponding to each calculated capacity qfan is read out from the lookup table 64, and each read-out value of the EPC current (swash plate control signal) is supplied to each swash plate control device (EPC solenoid) 42 corresponding to each hydraulic pump 41 for a cooling fan. As a result, the capacity of each hydraulic pump 41 for a cooling fan is controlled to each calculated capacity qfan.

Figure 9:
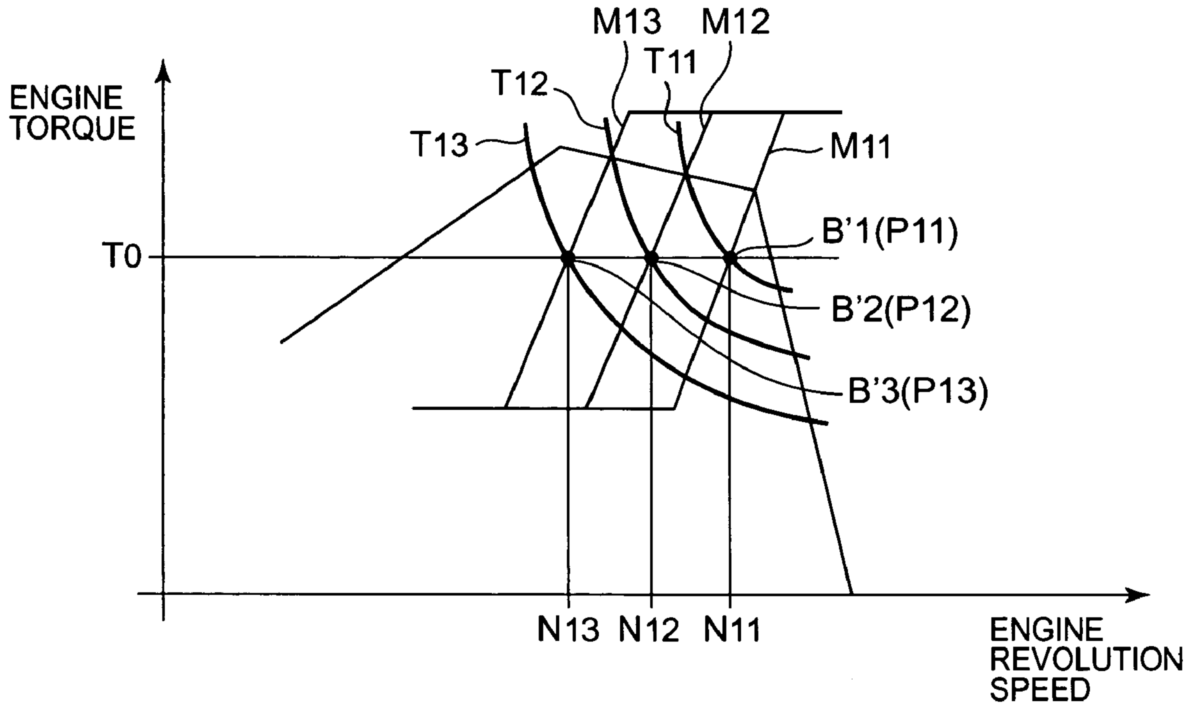
FIG. 9 shows an output characteristic of an engine and a pump for a work machine that serves to explain the control in the second embodiment of the present invention.
Figure 11A:
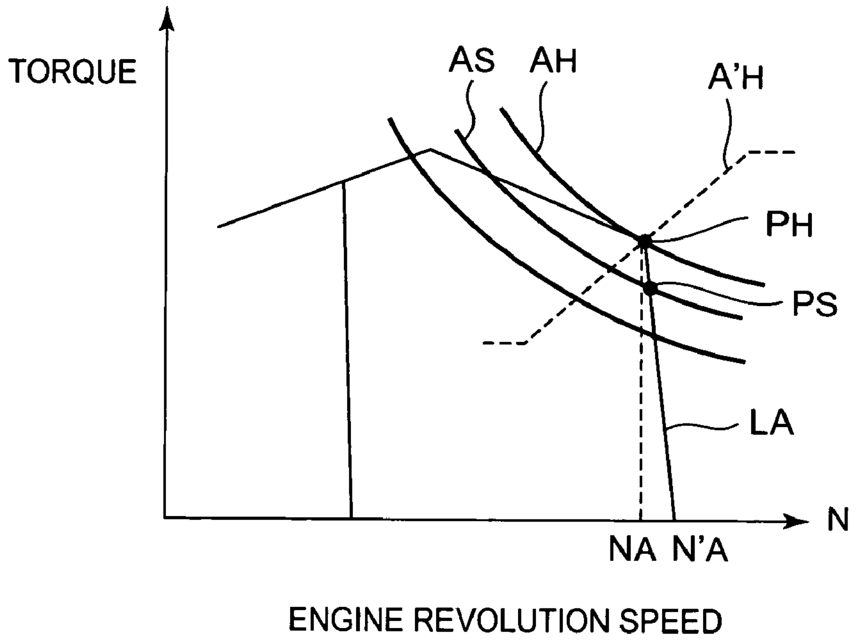
FIG. 11A PRIOR ART
FIG. 11 shows an engine output characteristic for explaining the prior art technology.
Figure 11B:
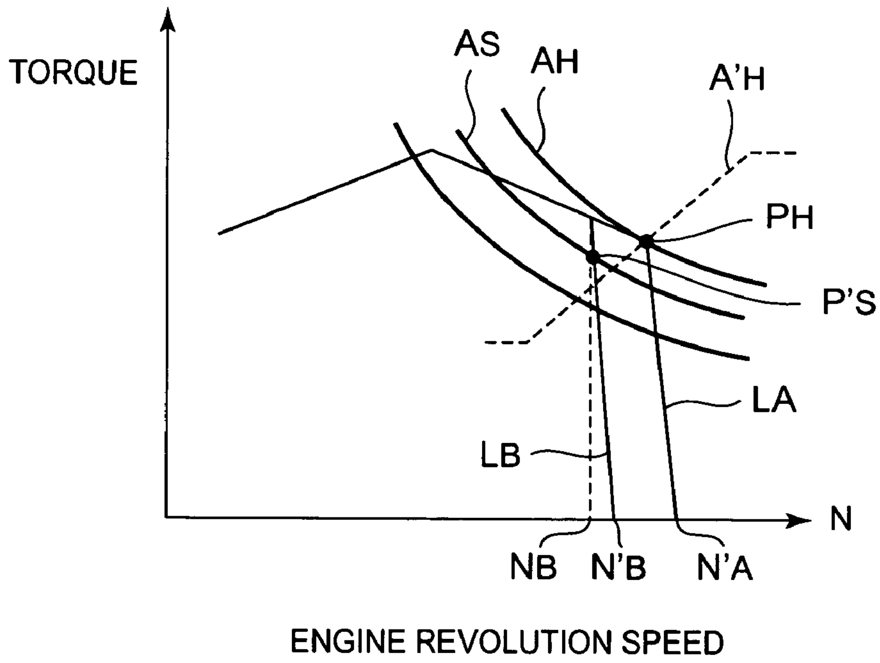
FIG. 11B PRIOR ART

The second embodiment of the device for controlling hydraulic drive in accordance with the present invention will be explained below. The hardware structure of the control device of this embodiment is substantially identical to the structure shown in FIG. 1. FIG. 9 shows an output characteristic of the engine and hydraulic pump from a work machine that illustrates the control method of this embodiment. FIG. 10 shows the entry data of the setting table 50 and the pertinent control values that are used for control in this embodiment.

In the previous embodiment, the control was conducted such that the revolution speed of the engine 21 was maintained substantially constant, despite the variation of the horsepower required by the load such as a work machine or auxiliary machine. By contrast, for example, when a ground shoving operation is performed with a bulldozer or hydraulic shovel, a stable ground shoving force is better maintained and, therefore, good operability is attained when a constant torque, rather than constant revolution speed is outputted. The control of the present embodiment follows this approach. Thus, as shown in FIG. 8, the engine 21 and hydraulic pumps 31, 31, . . . , 41, 41, . . . are controlled so that the output torque that is applied from the engine 21 to the work machine is maintained close to a constant value T0 even if the horsepower required for the work machine or auxiliary machine is increased or decreased.

As shown in FIG. 10, the operation types of the work machine can be classified, for example, into operation modes B1, B2, B3 of three types that differ in the value of work machine drive horsepower. The operation mode B1 corresponds to an operation type requiring the highest horsepower (for example, the ground shoveling work performed at a high gear of the transmission of the traveling device). The next operation mode B2 corresponds to an operation type requiring intermediate horsepower (for example, the ground shoveling work performed at an intermediate gear of the transmission), and the very last operation mode B3 corresponds to the operation type that requires the lowest horsepower (for example, the ground shoveling work performed at a low gear). Different pump torque control lines M11, M12, M13 and different engine output torque lines T11, T12, T13 are entered into the setting table 50 so as to be associated with respective operation modes B1, B2, B3. Specific pump torque control lines M11, M12, M13 and engine output torque lines T11, T12, T13 are shown in FIG. 9. For example, in the present embodiment, the engine output torque lines T11, T12, T13 are equal horsepower lines corresponding to horsepower values P11, P12, P13. The pump torque control lines M11, M12, M13 are defined by considering the engine output torque as an increasing function of the engine revolution speed, so as to facilitate matching with the engine output torque lines T11, T12, T13. It is noteworthy, that the output torque at a matching points of each pump torque control line M11, M12, M13 and engine output torque lines T11, T12, T13 is set to a constant value T0.

The control sequence of the present embodiment will be explained below.

Based on the signals from the work mode selector 16, work machine operation detector 11, and traveling operation detector 12, the pump controller 10 judges which of the above-described operation modes B1, B2, B3 is being implemented. The pump torque control line M11, M12, or M13 and the engine output torque lines T11, T12, or T13 (for example, the horsepower value P11, P12, or P13) corresponding to the identified operation mode is selected from the setting table 50. The total absorption horsepower ΣLf of the hydraulic pumps 41, 41, . . . for cooling fans is calculated from the work oil temperature, engine water temperature, external air temperature, and engine revolution speed, in the same manner as in the above-described embodiment. The total absorption horsepower ΣLf of the hydraulic pumps 41, 41, . . . for cooling fans that was thus calculated is added to the horsepower value P11, P12, or P13 at the matching point of the selected pump torque control line M11, M12, or M13 and the engine output torque lines T11, T12, or T13, and the target output horsepower of the engine 21 is found. The horsepower control command corresponding to the target output horsepower is supplied to the engine controller 20, and the engine controller 20 controls the fuel injection quantity of the engine 21. As a result, the engine 21 is operated on an equal horsepower line corresponding to the target output horsepower. At the same time, the total absorption torque of the hydraulic pumps 31, 31, . . . for work machines is controlled correspondingly to the engine revolution speed on the selected pump torque control line M11, M12, or M13. Furthermore, the hydraulic pumps 41, 41, . . . for cooling fans are controlled by the same method as in the previous embodiment. As a result, the engine 21 is operated in the vicinity of matching points B'1, B'2, or B'3 of the selected engine output torque lines T11, T12, or T13 and selected pump torque control line M11, M12, or M13. Therefore, the output torque of the engine 21 supplied to the work machine will be maintained, without significant variations, in the vicinity of the matching torque value T0 even when the operation type changes between the operation modes B1, B2, B3 and even if the absorption horsepower of the hydraulic pumps 41, 41, . . . for cooling fans changes.

The embodiments of the present invention were described above, but the embodiments are merely examples serving to illustrate the invention and the scope of the invention should not be construed as being limited to the embodiments. The invention can be implemented in a variety of other forms, without departing from the essence thereof.

For example, in the above-described embodiment, each engine output torque control line has been defined as an equal horsepower line corresponding to the certain horsepower, but this is not always necessary. An engine output torque control line may be also defined as a characteristic line such that the engine output horsepower changes depending on the engine revolution speed. In any case, the engine output torque control line and pump torque control line may be defined to ensure the desired characteristic, for example, such that engine revolution speed or output torque at the matching points of the engine output torque control lines and pump torque control lines corresponding to different operation modes are constant, regardless of the operation mode.

Furthermore, in the above-described embodiments, the operation mode corresponded to each of a variety of combinations of the work modes and operation types, but this is not always necessary. The operation mode may simply correspond to various operation types.

Furthermore, in the above-described embodiments, a hydraulic pump of a swash plate system and a variable capacity type was used, but the present invention is also applicable to hydraulic pumps of a variable capacity type and a system other than the swash plate system.

Furthermore, in the above-described embodiments, the pump torque control line and engine output horsepower control line have been determined based on the setting data that have been stored in the storage device in advance, but other methods, for example, a method of calling a computation function may be also used.

The auxiliary machines may include not only cooling fans, but also devices of other types, for example, generators or certain work machine attachments.

The invention claimed is:

1. A hydraulic drive control device of a construction machine comprising an engine and a hydraulic pump for a work machine that is driven by said engine, said device comprising:

an operation state detector for detecting an operation state of said work machine; and a controller for receiving a signal from said operation state detector and controlling said engine and said hydraulic pump for said work machine, wherein said controller receives the signal from said operation state detector and identifies an operation mode performed with respect to said work machine;

determines an engine output torque control line and a pump torque control line having a desired matching point according to said identified operation mode so that different engine output torque control lines and different pump torque control lines are designated for different operation modes;

controls an output torque of said engine based on said determined engine output torque control line; and controls an absorption torque of said hydraulic pump for said work machine based on said determined pump torque control line, wherein said controller determines said engine output torque control line and said pump torque control line so that an engine revolution speed at said matching point of said determined engine output torque control line and said determined pump torque control line assumes a substantially constant predetermined value for any identified operation mode, when said identified operation mode corresponds to any of a plurality of predetermined operation modes.

2. A hydraulic drive control device of a construction machine comprising an engine and a hydraulic pump for a work machine that is driven by said engine, said device comprising:

an operation state detector for detecting an operation state of said work machine; and a controller for receiving a signal from said operation state detector and controlling said engine and said hydraulic pump for said work machine, wherein said controller receives the signal from said operation state detector and identifies an operation mode performed with respect to said work machine;

determines an engine output torque control line and a pump torque control line having a desired matching point according to said identified operation mode so that different engine output torque control lines and different pump torque control lines are designated for different operation modes;

controls an output torque of said engine based on said determined engine output torque control line; and controls an absorption torque of said hydraulic pump for said work machine based on said determined pump torque control line, wherein said controller determines said engine output torque control line and said pump torque control line so that a torque at said matching point of said determined engine output torque control line and said determined pump torque control line assumes a substantially constant predetermined value for any identified operation mode, when said identified operation mode corresponds to any of a plurality of predetermined operation modes.

3. A hydraulic drive control device of a construction machine comprising an engine and a hydraulic pump for a work machine that is driven by said engine, said device comprising:

an operation state detector for detecting an operation state of said work machine; and a controller for receiving a signal from said operation state detector and controlling said engine and said hydraulic pump for said work machine, wherein said controller receives the signal from said operation state detector and identifies an operation mode performed with respect to said work machine;

determines an engine output torque control line and a pump torque control line having a desired matching point according to said identified operation mode so that different engine output torque control lines and different pump torque control lines are designated for different operation modes;

controls an output torque of said engine based on said determined engine output torque control line;

controls an absorption torque of said hydraulic pump for said work machine based on said determined pump torque control line; and a hydraulic pump for an auxiliary machine, which is driven by said engine and serves to drive said auxiliary machine of said construction machine, wherein said controller determines an absorption horsepower of said hydraulic pump for said work machine that is to be absorbed by said hydraulic pump for said work machine, according to said identified operation mode so that different absorption horsepower of said hydraulic pump for said work machine is designated for different operation modes;

detects a predetermined state value relating to an operation of said auxiliary machine and determines an absorption horsepower of said hydraulic pump for said auxiliary machine that is to be absorbed by said hydraulic pump for said auxiliary machine, according to said detected state value; and controls said engine so that an output horsepower of said engine becomes a sum of said determined absorption horsepower of the pump for the work machine and said determined absorption horsepower of said hydraulic pump for said auxiliary machine.

4. The hydraulic drive control device of a construction machine according to claim 3, wherein said controller controls said hydraulic pump for said work machine so that the absorption torque of said hydraulic pump for said work machine follows said determined pump torque control line; and determines a target revolution speed of said auxiliary machine according to said detected state value and controls a capacity of said hydraulic pump for said auxiliary machine so that said auxiliary machine can be driven at said determined target revolution speed.

5. A method for controlling hydraulic drive of a construction machine comprising an engine and a hydraulic pump for a work machine that is driven by said engine, said method comprising:

a step of identifying an operation mode performed with respect to said work machine;

a step of determining an engine output torque control line and a pump torque control line having a desired matching point according to said identified operation mode so that different engine output torque control lines and different pump torque control lines are designated for different operation modes;

a step of controlling an output torque of said engine based on said determined engine output torque control line;

a step of controlling an absorption torque of said hydraulic pump for said work machine based on said determined pump torque control line, wherein said engine output torque control line and said pump torque control line are controlled so that an engine revolution speed at said matching point of said determined engine output torque control line and said determined pump torque control line assumes a substantially constant predetermined value for any identified operation mode, when said identified operation mode corresponds to any of a plurality of predetermined operation modes.

6. A method for controlling hydraulic drive of a construction machine comprising an engine and a hydraulic pump for a work machine that is driven by said engine, said method comprising:

a step of identifying an operation mode performed with respect to said work machine;

a step of determining an engine output torque control line and a pump torque control line having a desired matching point according to said identified operation mode so that different engine output torque control lines and different pump torque control lines are designated for different operation modes;

a step of controlling an output torque of said engine based on said determined engine output torque control line;

a step of controlling an absorption torque of said hydraulic pump for said work machine based on said determined pump torque control line, wherein said engine output torque control line and said pump torque control line are determined so that a torque at said matching point of said determined engine output torque control line and said determined pump torque control line assumes a substantially constant predetermined value for any identified operation mode, when said identified operation mode corresponds to any of a plurality of predetermined operation modes.

7. A method for controlling hydraulic drive of a construction machine comprising an engine and a first hydraulic pump for a work machine that is driven by said engine, and a second hydraulic pump for an auxiliary machine, which is driven by said engine and serves to drive said auxiliary machine of said construction machine said method comprising:

a step of identifying an operation mode performed with respect to said work machine;

a step of determining an engine output torque control line and a pump torque control line having a desired matching point according to said identified operation mode so that different engine output torque control lines and different pump torque control lines are designated for different operation modes;

a step of controlling an output torque of said engine based on said determined engine output torque control line;

a step of controlling an absorption torque of said hydraulic pump for said work machine based on said determined pump torque control line, wherein an absorption horsepower of said hydraulic pump for said work machine that is to be absorbed by said hydraulic pump for said work machine is determined, according to said identified operation mode so that different absorption horsepower of said hydraulic pump for said work machine is designated for different operation modes, wherein a predetermined state value relating to an operation of said auxiliary machine is detected and an absorption horsepower of said hydraulic pump for said auxiliary machine that is to be absorbed by said hydraulic pump for said auxiliary machine is determined, according to said detected state value, and wherein said engine is controlled so that an output horsepower of said engine becomes a sum of said determined absorption horsepower of the pump for the work machine and said determined absorption horsepower of said hydraulic pump for said auxiliary machine.

8. A method for controlling hydraulic drive of a construction machine comprising an engine and a first hydraulic pump for a work machine that is driven by said engine, and a second hydraulic pump for an auxiliary machine, which is driven by said engine and serves to drive said auxiliary machine of said construction machine, said method comprising:

a step of identifying an operation mode performed with respect to said work machine;

a step of determining an engine output torque control line and a pump torque control line having a desired matching point according to said identified operation mode so that different engine output torque control lines and different pump torque control lines are designated for different operation modes;

a step of controlling an output torque of said engine based on said determined engine output torque control line;

a step of controlling an absorption torque of said hydraulic pump for said work machine based on said determined pump torque control line, wherein said hydraulic pump for said work machine is controlled so that the absorption torque of said hydraulic pump for said work machine follows said determined pump torque control line; and wherein a target revolution speed of said auxiliary machine is determined according to said detected state value and a capacity of said hydraulic pump for said auxiliary machine is controlled so that said auxiliary machine can be driven at said determined target revolution speed.

* * * * *